(12) United States Patent
Coggan et al.

(10) Patent No.: US 9,005,749 B2
(45) Date of Patent: *Apr. 14, 2015

(54) INTERMEDIATE TRANSFER MEMBERS

(71) Applicant: Xerox Corporation, Norwalk, CT (US)

(72) Inventors: Jennifer A Coggan, Kitchener (CA); Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 258 days.

This patent is subject to a terminal disclaimer.

(21) Appl. No.: 13/684,052

(22) Filed: Nov. 21, 2012

(65) Prior Publication Data

US 2014/0141252 A1    May 22, 2014

(51) Int. Cl.
  *G03G 15/16*    (2006.01)
  *C08G 73/10*    (2006.01)

(52) U.S. Cl.
  CPC .............. *G03G 15/162* (2013.01); *C08G 73/10* (2013.01); *C08G 73/1003* (2013.01)

(58) Field of Classification Search
  CPC ... G03G 15/162; C08G 73/10; C08G 73/1003
  USPC ................. 428/323, 327, 473.5; 399/302
  See application file for complete search history.

(56) References Cited

U.S. PATENT DOCUMENTS

| 5,873,018 | A | * | 2/1999 | Aoto et al. .................... 399/302 |
| 6,318,223 | B1 | | 11/2001 | Yu et al. |
| 6,397,034 | B1 | | 5/2002 | Tarnawskyj et al. |
| 6,440,515 | B1 | | 8/2002 | Thornton et al. |
| 6,602,156 | B2 | | 8/2003 | Schlueter |
| 7,031,647 | B2 | | 4/2006 | Mishra et al. |
| 7,130,569 | B2 | | 10/2006 | Goodman et al. |
| 7,139,519 | B2 | | 11/2006 | Darcy, III et al. |

OTHER PUBLICATIONS

Park et al., Facile fabrication of superhydrophobic coatings with polyimide particles using a reactive electrospraying process, Jun. 18, 2012, Journal of Materials Chemistry, 2012, 22,16005-16010.*

* cited by examiner

*Primary Examiner* — Elizabeth A Robinson
(74) *Attorney, Agent, or Firm* — Eugene O. Palazzo

(57) ABSTRACT

An intermediate transfer member that includes a mixture of superhydrophobic dimpled polyimide particles, an optional conductive component, and an optional polymer.

17 Claims, 1 Drawing Sheet

INTERMEDIATE TRANSFER MEMBERS

This disclosure is generally directed to an intermediate transfer member that comprises a superhydrophobic polyimide layer, optional conductive particles, optional polymer particles, and an optional release second layer, and which member can be prepared, for example, by reactive electrospraying processes, and where the resulting polyimide particles possess dimpled surfaces.

BACKGROUND

Intermediate transfer members that contain a release layer of low surface energy materials like TEFLON®, silicones and a number of fluoroelastomers are known. However, these release surface layers are substantially free of, or possess poor superhydrophobic characteristics as determined by their water contact angles being from about 80 to about 100°. Additionally, the low surface energy materials are very costly or of a sufficiently high cost that they are unattractive for use in intermediate transfer members.

Further, there are known intermediate transfer members that contain certain polyimides, however, these polyimides are not considered to be hydrophobic, which is attributed to the presence of imide functional groups which tend to increase the surface energy.

Also, there are known intermediate transfer members that include materials with characteristics that cause these members to become brittle resulting in inadequate acceptance of the developed image and subsequent partial transfer of developed xerographic images to a substrate like paper.

Yet further, numerous known intermediate transfer member surface coatings deteriorate thus resulting in members with poor wear characteristics.

There is a need for intermediate transfer members that substantially avoid or minimize the disadvantages of a number of known intermediate transfer members.

Also, there is a need for self-cleaning intermediate transfer members.

Yet another need resides in the provision of superhydrophobic intermediate transfer members that exhibit a high Young's modulus of, for example, from about 5,000 to about 10,000 Mega Pascals (MPa) and an excellent break strength of, for example, from about 105 to about 300 MPa, or from about 150 to about 225 MPa.

Moreover, there is a need for intermediate transfer members which possess improved stability with no or minimal degradation for extended time periods.

Another need relates to intermediate transfer members that have excellent conductivity or resistivity leading to developed images with minimal resolution issues.

Additionally, there is a need for intermediate transfer member containing components that can be economically and efficiently manufactured, and with excellent thermal, chemical, and mechanical stabilities.

Further, there is a need for intermediate transfer members with acceptable mechanical properties inclusive of extended time period toughness and improved wear resistant characteristics properties as determined, for example, by the water contact angles illustrated herein.

These and other needs are achievable in embodiments with the intermediate transfer members and components thereof disclosed herein.

SUMMARY

There is disclosed an intermediate transfer member comprising polyimide particles that possess dimpled surfaces.

Also disclosed is a self-cleaning wear resistant intermediate transfer member comprised of a supporting substrate, and a layer thereover comprised of a mixture of superhydrophobic dimpled polyimide particles and a conductive component, wherein the polyimide dimpled particles have a water contact angle of from about 105 to about 200 degrees, and wherein the dimples of the dimpled surfaces encompass from about 90 to about 100 percent of the surface area of the polyimide particles.

Further disclosed is a process for the preparation of polyimide particles comprising the electrospraying of a polyamic acid solution into a heated silicone oil at a temperature of from about 175° C. to about 225° C. thereby causing an imidization reaction, and where there is generated spherical shaped dimpled superhydrophobic polyimide particles.

FIGURES

The following Figures are provided to further illustrate the intermediate transfer members disclosed herein.

EMBODIMENTS

There is disclosed herein an intermediate transfer member comprising or having incorporated therein polyimide spherical shaped particles, and where the morphology of the spherical particles relates to the dimpled surfaces thereon, a conductive component, and optional polymers, such as a polyimide, a polycarbonate, a polyamideimide, a polyphenylene sulfide, a polyamide, a polysulfone, a polyetherimide, a polyester, a polysiloxane and mixtures thereof.

The polyimide particles with dimpled surfaces morphology enables self-cleaning intermediate transfer members where the photoconductor that is connected to the intermediate transfer member does not have to be cleaned with, for example, a cleaning device.

Superhydrophobicity dimpled polyimide particles refers, for example, to the surface thereof being highly hydrophobic, that is such surfaces are extremely difficult to wet as measured by the contact angle of a water droplet, and which angle is equal to or in excess of about 100° (degrees), and for example, from about 101° (degrees) to about 200°, from about 105° to about 200°, from about 105° to about 175°, from about 150° to about 200°, from about 151° to about 180°, or from about 165° to about 175°. The superhydrophobicity polyimides illustrated herein possess a surface morphology that is similar to, or the same as, the morphology of the lotus-leaf, and where the spherical shaped protrusion polyimide microstructure sheds water drops like drops on a lotus leaf, or where the polyimides repel water, thereby providing self-cleaning polyimide containing intermediate transfer members.

Figure 1:
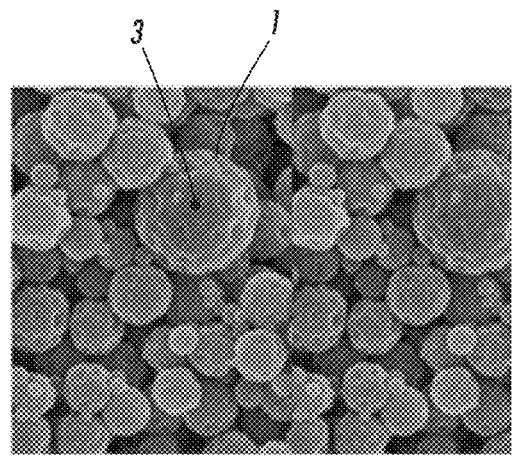
FIG. 1 illustrates an exemplary embodiment of the dimpled superhydrophobic polyimide particles of the present disclosure.

In FIG. 1, there is illustrated superhydrophobicity polyimide particles 1, with a series of dimples thereon 3, the spherical shape of the particles and the presence of dimples being determined by scanning electron microscopy (SEM) and transmission electron microscopy (TEM) images of the particles where the dimples encompass, for example, from about 90 to about 100 percent of the entire surfaces of the polyimide particles, and the size diameter thereof is from about 0.1 to about 5 microns.

Figure 2:
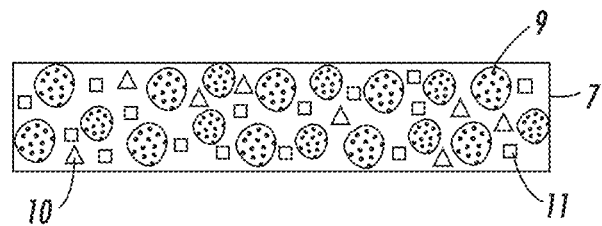
FIG. 2 illustrates an exemplary embodiment of a one-layer intermediate transfer member of the present disclosure.

In FIG. 2, there is illustrated a single layer intermediate transfer member comprising layer 7, containing superhydrophobicity polyimide dimpled particles 9, conductive particles 10, and optional polymer particles 11.

Figure 3:
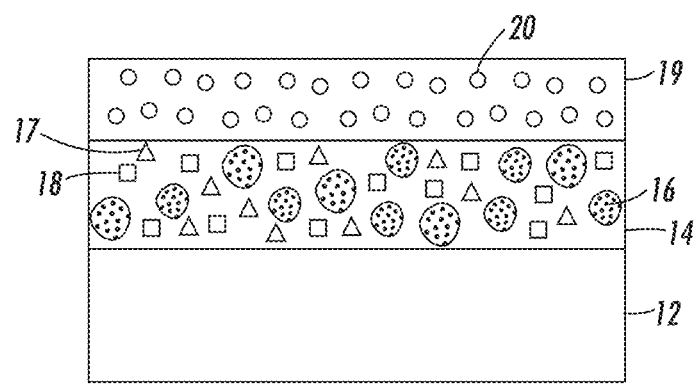
FIG. 3 illustrates an exemplary embodiment of a two-layer intermediate transfer member of the present disclosure.

In FIG. 3, there is illustrated a two-layer intermediate transfer member comprising a bottom or base layer 12, a surface layer thereover 14, containing superhydrophobicity polyimide dimpled particles 16, conductive particles 17, and optional polymer particles 18, and an optional top release layer 19, comprising film releasing components 20.

The intermediate transfer members disclosed herein are superhydrophobic in that they repel water, and thus exhibit excellent toner transfer and excellent cleaning efficiencies, and these members also exhibit self release characteristics; have excellent mechanical strength while permitting the rapid and complete transfer of from about 90 to about 99 percent, and from about 95 to about 100 percent transfer of a xerographic developed image from a photoconductor in a xerographic imaging process and xerographic apparatus; possess a Young's modulus of, for example, from about 5,000 to about 10,000 Mega Pascals (MPa), from about 5,500 to about 9,500 MPa, from about 6,000 to about 9,000 MPa, or from about 7,500 to about 8,700 MPa; a break strength of from about 100 to about 300 MPa, or from about 155 to about 215 MPa; a CTE (coefficient of thermal expansion) of from about 10 to about 50 ppm/° K, or from about 15 to about 30 ppm/° K; and desirable resistivity as measured with a known High Resistivity Meter of, for example, from about $10^8$ to about $10^{13}$ ohm/square, from about $10^9$ to about $10^{13}$ ohm/square, from about $10^9$ to about $10^{12}$ ohm/square, or from about $10^9$ to about $10^{10}$ ohm/square.

Also, an advantage of the dimpled surfaces on the polyimide particles allows for the adherence of low surface energy additives, such as silicone oils to the surface thereof and where the additives are believed to assist in increasing superhydrophobicity.

The intermediate transfer members of the present disclosure can be provided in any of a variety of configurations, such as a one-layer configuration, or in a multi-layer configuration including, for example, a top toner release layer. More specifically, the final intermediate transfer member may be in the form of an endless flexible belt, a web, a flexible drum or roller, a rigid roller or cylinder, a sheet, a drelt (a cross between a drum and a belt), a seamless belt, that is with an absence of any seams or visible joints in the members, and the like.

Dimpled Polyimide Particles

The disclosed dimpled polyimides with various effective diameters as determined by scanning electron microscopy of, for example, from about 0.1 to about 5 microns, from about 0.1 to about 4 microns, from about 1 to about 3 microns, or from about 0.5 to about 2 microns, can be prepared, for example, by the reactive electrospraying process as illustrated in a published paper authored by Jin Young Park, Kyung Ok Oh, Jong Chan Won, Haksoo Han, Hyun Min Jung and Yong Seok Kim in the *Journal of Materials Chemistry*, 2012, 22, 16005-16010, the disclosure of this paper being totally incorporated here by reference. For example, the superhydrophobicity polyimide particles can be generated by the electrospraying of a poly(amic acid) solution onto and into a heated silicone oil at a temperature of, for example, from about 175° C. to about 225° C., which causes an insitu imidization resulting in spherically shaped polyimide particles with dimpled surfaces, and where the dimples are present on the surface in an area of from about 90 to about 100 percent, from about 93 to about 99 percent, or from about 95 to about 98 percent of the polyimide particles, and which dimples resemble or are the same as the dimples on a golf ball.

In the disclosed electrospraying process a polyamic acid (PAA) solution is pumped through a nozzle in which a high voltage of about 14 kilovolts (kV) is applied to form an electrically charged jet of the PAA solution. When from about 10 to about 25 weight percent of the PAA droplets are electrosprayed into silicone oil that is heated and at a temperature of from about 175° C. to about 225° C., or from about 195° C. to about 210° C., the electrospraying being at a flow rate of from about 0.5 milliliter to about 3 milliliters per hour (mL/h), there is obtainable after cooling the dimpled polyimide particles. The electrostatically charged PAA droplets are maintained in the hydrophobic silicone oil to prevent their coagulation and agglomeration during their conversion by curing at a temperature of from about 175° C. to about 225° C. thereby forming the isolatable spherical dimpled polyimide particles.

Examples of polyamic acids that can be utilized for generating the superhydrophobicity dimpled polyimide particles can be formed by the reaction of a dianhydride and a diamine. Suitable dianhydrides reactants include aromatic dianhydrides and aromatic tetracarboxylic acid dianhydrides, such as, for example, 3,3',4,4'-tetracarboxybiphenyl dianhydride, 3,3',4,4'-tetracarboxybenzophenone dianhydride, di-(4-(3,4-dicarboxyphenoxy)phenyl)ether dianhydride, di-(4-(3,4-dicarboxyphenoxy)phenyl)sulfide dianhydride, di-(3,4-dicarboxyphenyl)methane dianhydride, di-(3,4-dicarboxyphenyl)ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl)ether dianhydride, bis(3,4-dicarboxyphenyl)sulfone dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic dianhydride, 4,4'-(m-phenylenedioxy)diphthalic dianhydride, 4,4'-diphenylsulfidedioxybis(4-phthalic acid)dianhydride, 4,4'-diphenylsulfonedioxybis(4-phthalic acid)dianhydride, methylenebis(4-phenyleneoxy-4-phthalic acid)dianhydride, ethylidenebis(4-phenyleneoxy-4-phthalic acid)dianhydride, isopropylidenebis-(4-phenyleneoxy-4-phthalic acid)dianhydride, and mixtures thereof.

Exemplary diamines selected for reaction with the dianhydrides to form the polyamic acids include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3-bis-(gamma-aminopropyl)-tetramethyl-disiloxane, 1,6-diaminohexane, 4,4'-diaminodiphenylmethane, 3,3'-diaminodiphenylmethane, 1,3-diaminobenzene, 4,4'-diaminodiphenyl ether, 2,4'-diaminodiphenylether, 3,3'-diaminodiphenylether, 3,4'-diaminodiphenylether, 1,4-diaminobenzene, bis[4-(3-aminophenoxy)-phenyl]sulfide, bis[4-(3-aminophenoxy)phenyl]

sulfone, bis[4-(3-aminophenoxy)phenyl]ketone, 4,4'-bis(3-aminophenoxy)biphenyl, 2,2-bis[4-(3-aminophenoxy)phenyl]-propane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, and mixtures thereof.

The dianhydride and diamine reactants can be selected in various suitable amounts, such as for example in a weight ratio of dianhydride to diamine of from about 20:80 to about 80:20, from about 40:60 to about 60:40, or about a 50:50 mole ratio.

The dianhydride and diamine reactants are dissolved in a solvent, such as N-methyl-2-pyrrolidone, N,N-dimethylformamide, N,N-dimethylacetamide, methyl ethyl ketone, dimethylsulfoxide, methyl isobutyl ketone, and the like under a nitrogen flow. The resulting reaction mixture is then allowed to stir at a temperature of from about 0° C. to about 60° C., or from about 10° C. to about 40° C. for a period of from about 12 to about 36 hours, or from about 18 to about 25 hours resulting in a polyamic acid solution with a solid content of from about 5 to about 20 weight percent, or from about 10 to about 15 weight percent of the solids.

The generated disclosed polyamic acids include at least one of a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and mixtures thereof.

Commercially available examples of polyamic acids of pyromellitic dianhydride/4,4'-oxydianiline that can be selected for conversion to the dimpled polyimde particles include PYRE-ML™ RC5019 (about 15 to 16 weight percent in N-methyl-2-pyrrolidone, NMP), RC5057 (about 14.5 to 15.5 weight percent in NMP/aromatic hydrocarbon=80/20), and RC5083 (about 18 to 19 weight percent in NMP/DMAc=15/85), all obtainable from Industrial Summit Technology Corporation, Parlin, N.J.; DURIMIDE®100, commercially available from FUJIFILM Electronic Materials U.S.A., Incorporated, and commercially available examples of polyamic acid of biphenyl tetracarboxylic dianhydride/4,4'-oxydianiline that can be selected for conversion to the dimpled polyimde particles include U-VARNISH A™, and S (about 20 weight in NMP), both available from UBE America Inc., New York, N.Y.

Examples of polyamic acids of biphenyl tetracarboxylic dianhydride/phenylenediamine that can be selected for conversion to the dimpled polyimde particles include PI-2610 (about 10.5 weight in NMP), and PI-2611 (about 13.5 weight in NMP), both from HD MicroSystems, Parlin, N.J.; commercially available examples of polyamic acids of benzophenone tetracarboxylic dianhydride/4,4'-oxydianiline include RP46 and RP50 (about 18 weight percent in NMP), both from Unitech Corp., Hampton, Va., and commercially available examples of polyamic acid of benzophenone tetracarboxylic dianhydride/4,4'-oxydianiline/phenylenediamine include PI-2525 (about 25 weight percent in NMP), PI-2574 (about 25 weight percent in NMP), PI-2555 (about 19 weight percent in NMP/aromatic hydrocarbon=80/20), and PI-2556 (about 15 weight percent in NMP/aromatic hydrocarbon/propylene glycol methyl ether=70/15/15), all obtainable from HD MicroSystems, Parlin, N.J.

Optional Fillers

Optionally, the intermediate transfer member may contain one or more component fillers or conductive fillers to, for example, alter and adjust the conductivity of the intermediate transfer member. Where the intermediate transfer member is a one layer structure, the conductive filler can be included in the polyimides disclosed herein. However, when the intermediate transfer member is a multi-layer structure, the conductive filler can be included in all layers of the member, such as in both the supporting substrate and the polyimide layer.

Various effective suitable fillers can be used that provide the desired results. For example, suitable fillers include carbon blacks, metal oxides, polyanilines, other known suitable fillers, and mixtures of fillers.

Examples of carbon black fillers that can be selected for the intermediate transfer members illustrated herein include special black 4 (B.E.T. surface area=180 $m^2/g$, DBP absorption=1.8 ml/g, primary particle diameter=25 nanometers) available from Evonik-Degussa, special black 5 (B.E.T. surface area=240 $m^2/g$, DBP absorption=1.41 ml/g, primary particle diameter=20 nanometers), color black FW1 (B.E.T. surface area=320 $m^2/g$, DBP absorption=2.89 ml/g, primary particle diameter=13 nanometers), color black FW2 (B.E.T. surface area=460 $m^2/g$, DBP absorption=4.82 ml/g, primary particle diameter=13 nanometers), color black FW200 (B.E.T. surface area=460 $m^2/g$, DBP absorption=4.6 ml/g, primary particle diameter=13 nanometers), all available from Evonik-Degussa; VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS® 1000 (B.E.T. surface area=343 $m^2/g$, DBP absorption=1.05 ml/g), BLACK PEARLS® 880 (B.E.T. surface area=240 $m^2/g$, DBP absorption=1.06 ml/g), BLACK PEARLS® 800 (B.E.T. surface area=230 $m^2/g$, DBP absorption=0.68 ml/g), BLACK PEARLS® L (B.E.T. surface area=138 $m^2/g$, DBP absorption=0.61 ml/g), BLACK PEARLS® 570 (B.E.T. surface area=110 $m^2/g$, DBP absorption=1.14 ml/g), BLACK PEARLS® 170 (B.E.T. surface area=35 $m^2/g$, DBP absorption=1.22 ml/g), VULCAN® XC72 (B.E.T. surface area=254 $m^2/g$, DBP absorption=1.76 ml/g), VULCAN® XC72R (fluffy form of VULCAN® XC72), VULCAN® XC605, VULCAN® XC305, REGAL® 660 (B.E.T. surface area=112 $m^2/g$, DBP absorption=0.59 ml/g), REGAL®400 (B.E.T. surface area=96 $m^2/g$, DBP absorption=0.69 ml/g), REGAL®330 (B.E.T. surface area=94 $m^2/g$, DBP absorption=0.71 ml/g), MONARCH® 880 (B.E.T. surface area=220 $m^2/g$, DBP absorption=1.05 ml/g, primary particle diameter=16 nanometers), and MONARCH®1000 (B.E.T. surface area=343 $m^2/g$, DBP absorption=1.05 ml/g, primary particle diameter=16 nanometers); special carbon blacks available from Evonik Incorporated; and Channel carbon blacks available from Evonik-Degussa. Other known suitable carbon blacks not specifically disclosed herein may be selected as the filler or conductive component for the intermediate transfer members disclosed herein.

Examples of polyaniline fillers that can be selected for incorporation into the intermediate transfer member compositions are PANIPOL™ F, commercially available from Panipol Oy, Finland, and known lignosulfonic acid grafted polyanilines. These polyanilines usually have a relatively small particle size diameter of, for example, from about 0.5 to about 5 microns; from about 1.1 to about 2.3 microns, or from about 1.5 to about 1.9 microns.

Metal oxide fillers that can be selected for the disclosed intermediate transfer member composition include, for example, tin oxide, antimony doped tin oxide, indium oxide, indium tin oxide, zinc oxide, and titanium oxide, and the like.

When present, the filler or conductive component can be selected in an amount of, for example, from about 1 to about 60 weight percent, from about 3 to about 40 weight percent, from about 4 to about 30 weight percent, from about 10 to about 30 percent, from about 3 to about 30 weight percent, from about 5 to about 30 weight percent, from about 8 to about 25 weight percent, or from about 14 to about 20 weight percent of the total solids of the dimpled polyimide particles mixture and the conductive component or filler and optional polymers, and where the dimpled polyimide particles are present in an amount so that the total of the filler and the dimpled particles is about 100 percent solids. Thus, the dimpled polyimide particles can be present in from about 40 to about 99, from about 60 to about 97, from about 70 to about 96, from about 70 to about 90, from about 70 to about 97, from about 70 to about 95, from about 75 to about 92, or from about 80 to about 86 weight percent. The ratio weight of the polyimide to the conductive filler component, such as carbon black, can be, for example, from about 95/5 to about 60/40, or from about 90/10 to about 80/20, primarily determined by the amounts of components selected, or the feed rates thereof.

Optional Polymers

The intermediate transfer members illustrated herein can also further comprise a polymer, such as a polyimide, a polycarbonate, a polyamideimide, a polyphenylene sulfide, a polyamide, a polysulfone, a polyetherimide, a polyester, a polysiloxane and mixtures thereof, which polymers are available from a number of companies, such as E.I. DuPont. Examples of polysiloxane polymers selected for the intermediate transfer member mixture disclosed herein include known suitable polysiloxanes, such as a polyether modified polydimethylsiloxane, commercially available from BYK Chemical as BYK®333, BYK®330 (about 51 weight percent in methoxypropylacetate), BYK®344 (about 52.3 weight percent in xylene/isobutanol, ratio of 80/20), BYK®-SILCLEAN 3710 and BYK®3720 (about 25 weight percent in methoxypropanol); a polyester modified polydimethylsiloxane, commercially available from BYK Chemical as BYK®310 (about 25 weight percent in xylene) and BYK®370 (about 25 weight percent in xylene/alkylbenzenes/cyclohexanone/monophenylglycol, ratio of 75/11/7/7); a polyacrylate modified polydimethylsiloxane, commercially available from BYK Chemical as BYK®-SILCLEAN 3700 (about 25 weight percent in methoxypropylacetate); a polyester polyether modified polydimethylsiloxane, commercially available from BYK Chemical as BYK®375 (about 25 weight percent in di-propylene glycol monomethyl ether), and mixtures thereof.

The particles of the polymers, such as the polysiloxane polymers or copolymers thereof can be present in the intermediate transfer member mixture in various effective amounts, such as for example, from about 0.01 to about 5 weight percent, from about 0.05 to about 1 weight percent, from about 0.05 to about 0.5 weight percent, or from about 0.1 to about 0.3 weight percent based on the weight of the solid components present in the mixture, such as the components of the dimpled polyimides, the optional polysiloxane polymer, and when present the conductive component.

Optional Release Layer

When desired, an optional release layer can be included over the dimpled polyimide layer illustrated herein. The release layer may be included to assist in providing developed image transfer efficiency from a photoconductor to the intermediate transfer member.

When selected, the release layer can have any desired and suitable thickness. For example, the release layer can have a thickness of from about 1 to about 100 microns, about 10 to about 75 microns, or from about 20 to about 50 microns.

The optional release layer can comprise TEFLON®-like materials including fluorinated ethylene propylene copolymer (FEP), polytetrafluoroethylene (PTFE), polyfluoroalkoxy polytetrafluoroethylene (PFA TEFLON®), and other TEFLON®-like materials; silicone materials, such as fluorosilicones and silicone rubbers, such as Silicone Rubber 552, available from Sampson Coatings, Richmond, Va., (polydimethyl siloxane/dibutyl tin diacetate, 0.45 gram DBTDA per 100 grams of the polydimethyl siloxane rubber mixture, with a molecular weight $M_w$ of approximately 3,500); and fluoroelastomers, such as those sold as VITON®, such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, and VITON GF®. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON A®; (2) a class of terpolymers of vinylidenefluoride, hexafluoropropylene, and tetrafluoroethylene, known commercially as VITON B®; and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomers can be those available from E.I. DuPont de Nemours, Inc. such as 4-bromoperfluorobutene-1,1,1-dihydro-4-bromoperfluorobutene-1,3-bromoperfluoropropene-1,1,1-dihydro-3-bromoperfluoropropene-1, or commercially available cure site monomers.

Intermediate Transfer Member Formation

The superhydrophobic dimpled polyimide particles illustrated herein, together with a conductive filler, such as carbon black, a polyaniline, or a metal oxide, can be dispersed in a polymeric binder such as a polyimide, a polycarbonate, a polyamideimide, a polyphenylene sulfide, a polyamide, a polysulfone, a polyetherimide, a polyester, a polysiloxane and mixtures thereof. Subsequently, with known milling processes uniform dispersions of the intermediate transfer member mixtures can be obtained and coated on individual metal substrates, such as a stainless steel substrate or the like, using known draw bar coating processes or flow coating methods. The resulting individual film or films can be dried at high temperatures, such as by heating and curing the films such as by heating at 120° C. (degrees Centigrade) for 30 minutes, 190° C. for 30 minutes, and 320° C. for 60 minutes, or generally curing by heating the intermediate transfer member mixture to from about 100° C. to about 400° C. while remaining on the substrate. The resultant intermediate transfer film product, which self releases or is removed from the metal substrate, can have a thickness of, for example, from about 15 to about 150 microns, from about 20 to about 100 microns, or from about 50 to about 75 microns.

Yet more specifically, for a single layered intermediate transfer member a dimpled polyimide/filler dispersion can be prepared as illustrated herein. Subsequently, the dispersion formed can be electrosprayed onto a heating stainless steel substrate at a temperature of from about 180° C. to about 220° C., or from 190° C. to about 210° C. thereby resulting in a film that comprises the dimpled polyimide particles. Thereafter, the film obtained is cured in an oven at a temperature of from about 250° C. to about 320° C., or from about 275° C. to about 310° C. for a suitable period of time of from about 0.5 to about 2 hours, or from about 1 to about 1.5 hours followed by cooling to room temperature of about 23° C. to 25° C.

A multilayered intermediate transfer member of the present disclosure can be prepared by generating the dimpled polyimide particles by the reactive electrospraying processes as illustrated herein, followed by mixing the particles obtained with a conductive filler or component, like carbon black and a polymeric binder; providing a base polymer layer or supporting substrate dispersion; coating the base layer on a metal substrate and partially, from about 50 to about 75 percent, curing it by heating to 190° C.; coating the reactive electrosprayed dimpled polyimide particle/conductive filler/polymer dispersion on top of the base layer followed by complete, from about 95 to about 100 percent, thermal curing at a temperature of from about 280° C. to about 320° C., and removal of the resulting dimpled polyimide film from the metal substrate.

In another embodiment, a multilayered intermediate transfer member of the present disclosure can be prepared by mixing a polyamic acid solution with a conductive filler or component like carbon black to form a polyamic acid/carbon black dispersion; providing as the base layer coating dispersion, a known polyamic acid/carbon black mixture; then coating the base layer on a metal substrate and partially curing it by heating to 190° C.; electrospraying the prepared polyamic acid/conductive dispersion on top of the base layer that is heated to a temperature of from about 180° C. to about 220° C. followed by complete thermal curing at a temperature of from about 280° C. to about 320° C., and removal of the resulting film from the metal substrate.

Metal Substrates

As metal substrates selected for the deposition of the spherical shaped dimpled polyimide particles disclosed herein, there can be selected stainless steel, aluminum, nickel, copper, and their alloys, glass plates, and other conventional typical known materials.

Examples of solvents selected for formation of the intermediate transfer member mixture compositions or dispersions, which solvents can be selected in an amount of, for example, from about 60 to about 95 weight percent, or from about 70 to about 90 weight percent of the total mixture components weight include alkylene halides, such as methylene chloride, tetrahydrofuran, toluene, halobenzenes, such as monochlorobenzene; N-methyl-2-pyrrolidone (NMP), N,N-dimethylformamide, N,N-dimethylacetamide, methyl ethyl ketone, dimethylsulfoxide, methyl isobutyl ketone, formamide, acetone, ethyl acetate, cyclohexanone, acetanilide, mixtures thereof, and the like. Diluents can be mixed with the solvents selected for the intermediate transfer member mixtures. Examples of diluents added to the solvents in amounts of from about 1 to about 25 weight percent, and from 1 to about 10 weight percent based on the weight of the solvent and the diluent are known diluents like aromatic hydrocarbons, ethyl acetate, acetone, cyclohexanone and acetanilide.

Optional Supporting Substrates

Subsequent to release of the generated superhydrophobic dimpled polyimide particles containing mixture from the metal substrate, an optional supporting substrate can be included in the intermediate transfer member, such as beneath the generated dimpled polyimide containing film layer. An optional supporting substrate can be included to provide increased rigidity or strength to the intermediate transfer member.

Examples of the intermediate transfer member supporting substrates are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa., polyamideimides, polyetherimides, and the like The thermosetting polyimides can be cured at temperatures of from about 180° C. to about 260° C. over a short period of time, such as from about 10 to about 120 minutes, or from about 20 to about 60 minutes, and generally have a number average molecular weight of from about 5,000 to about 500,000 or from about 10,000 to about 100,000, and a weight average molecular weight of from about 50,000 to about 5,000,000 or from about 100,000 to about 1,000,000. Also, for the supporting substrate there can be selected thermosetting polyimides that can be cured at temperatures of above 300° C., such as PYRE M.L.® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE®100, commercially available from FUJIFILM Electronic Materials U.S.A., Inc., North Kingstown, R.I.; and KAPTON® HN, VN and FN, all commercially available from E.I. DuPont, Wilmington, Del.

Examples of polyamideimides that can be selected as supporting substrates for the intermediate transfer members disclosed herein are VYLOMAX® HR-11NN (15 weight percent solution in N-methylpyrrolidone, $T_g=300°$ C., and $M_w=45,000$), HR-12N2 (30 weight percent solution in N-methylpyrrolidone/xylene/methyl ethyl ketone=50/35/15, $T_g=255°$ C., and $M_w=8,000$), HR-13NX (30 weight percent solution in N-methylpyrrolidone/xylene=67/33, $T_g=280°$ C., and $M_w=10,000$), HR-15ET (25 weight percent solution in ethanol/toluene=50/50, $T_g=260°$ C., and $M_w=10,000$), HR-16NN (14 weight percent solution in N-methylpyrrolidone, $T_g=320°$ C., and $M_w=100,000$), all commercially available from Toyobo Company of Japan, and TORLON® Al-10 ($T_g=272°$ C.), commercially available from Solvay Advanced Polymers, LLC, Alpharetta, Ga.

A supporting substrate polyimide that can be selected for the disclosed intermediate transfer is selected from at least one of the group consisting of the following formulas/structures

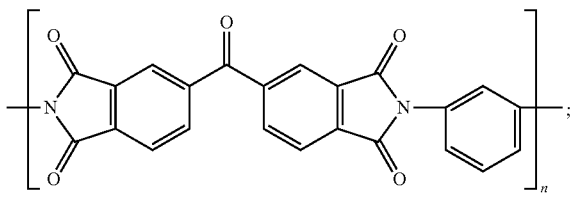

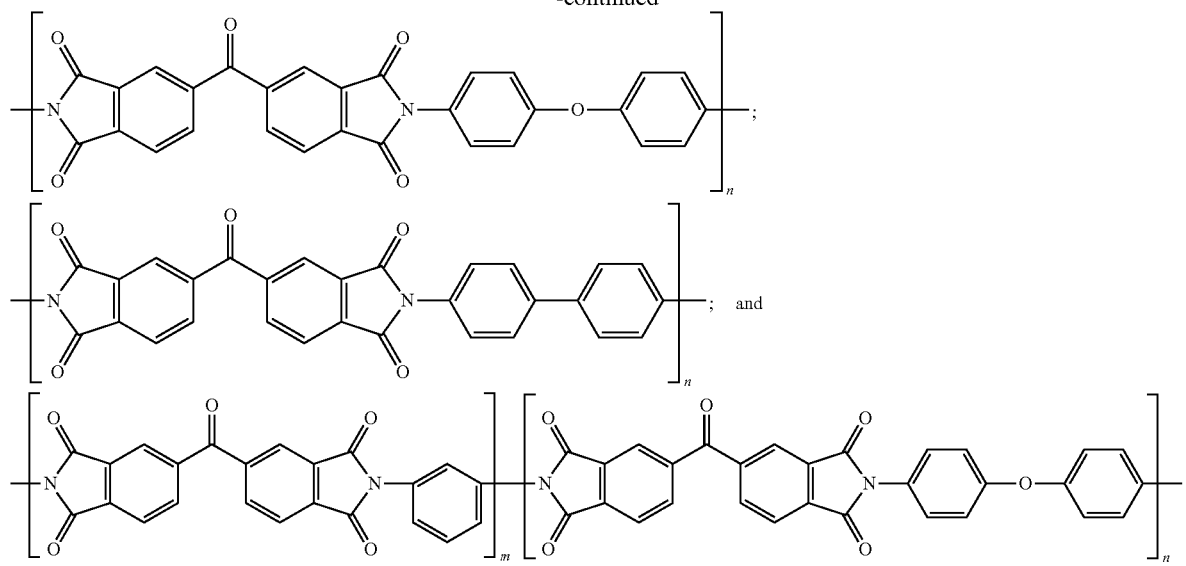

wherein each n and m represents the number of repeating units of from about 50 to about 2,000.

Examples of specific polyetherimide supporting substrates that can be selected for the intermediate transfer members disclosed herein are ULTEM®1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Once formed, the supporting substrate can have any desired and suitable thickness. For example, the supporting substrate can have a thickness of from about 10 to about 300 microns, such as from about 50 to about 150 microns, from about 75 to about 125 microns, or about 80 microns.

The intermediate transfer members illustrated herein can be utilized for a number of printing and copying systems, inclusive of xerographic printing systems that contain photoconductors. For example, the disclosed intermediate transfer members can be incorporated into a multi-imaging xerographic machine where each developed toner image to be transferred is formed on a photoconductor at an image forming station, and where each of these images is then developed at a developing station, and transferred to the intermediate transfer member. Also, the images may be formed on a photoconductor and developed sequentially, and then transferred to the intermediate transfer member. In an alternative method, each image may be formed on the photoconductor or photoreceptor drum connected to, or in close proximity to the intermediate transfer member, developed, and then transferred in registration to the intermediate transfer member. The multi-image stage system in embodiments can be a color copying system, wherein each color of an image being copied is formed on a photoconductor, developed with toners, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed by heat in image configuration to an image receiving substrate.

Specific embodiments will now be described in detail. These examples are intended to be illustrative, and are not limited to the materials, conditions, or process parameters set forth in these embodiments. All parts are percentages by weight of total solids unless otherwise indicated. The water contact angles illustrated herein and in the Examples that follow are measured at ambient temperature (about 23° C. to 25° C.) using the known Contact Angle System OCA (Dataphysics Instruments GmbH, model OCA15).

Comparative Example 1

A polyamic acid solution is prepared as follows 4,4'-oxydianiline (ODA, 0.05 mol) is dissolved in 100 ml (milliliters) of dimethylformamide (DMF) in a 250 millimeter 3-neck round flask under a nitrogen flow. After the 4,4'-oxydianiline diamine is completely dissolved, pyromellitic dianhydride (PMDA, 0.05 mol) is added in one portion. To the resulting stirred mixture, in an ice bath, additional dimethylformamide (DMF) is added until the total amount of DMF is 199 milliliters, and then the resulting reaction mixture is stirred for 24 hours.

The resulting polyamic acid of pyromellitic dianhydride/ 4,4'-oxydianiline solution is ball milled with special carbon black 4 obtained from Evonik Incorporated in a weight ratio of 87/13 based on the initial mixture feed amounts. The obtainable polyamic acid/carbon black dispersion is coated on a stainless steel substrate at about 23° C. via a draw bar coater, and subsequently the dispersion is cured at 190° C. for 30 minutes, and at 320° C. for 60 minutes. The resulting 75 micron polyimide/carbon black, 87/13 weight percent of solids, intermediate transfer member is then removed from the stainless steel substrate.

Example I

The disclosed superhydrophobic dimpled polyimides are prepared by the reactive electrospraying process as illustrated in a published paper authored by Jin Young Park, Kyung Ok Oh, Jong Chan Won, Haksoo Han, Hyun Min Jung and Yong Seok Kim in the *Journal of Materials Chemistry*, 2012, 22, 16005-16010, the disclosure of this paper being totally incorporated herein by reference.

In one aspect of the Jin Young Park et al. process, there is utilized a device that comprises a syringe pump (KDS 100, KDScientific, USA) connected to a 10 milliliter plastic syringe (HSW NORM-JECT, Germany), a high voltage supply (NNC-30K-2 mA, NanoNC, Korea) and a grounded collector. The polyamic acid solution prepared as in Comparative Example 1 is loaded into the syringe and continuously infused or jetted by the syringe pump to a nozzle with an internal diameter of 150 millimeters then from the nozzle to a silicone oil that is at a temperature of from about 175° C. to about 225° C. The distance from the nozzle to the collector is retained at 13 centimeters, and the voltage is applied to the syringe in a range of 9 to 22 kV. The spraying of the mixture from the syringe in a cone-jet form is monitored by a high magnification CCD camera (VIEWRUN, Korea).

After electrospraying the mixture from the syringe, the resulting dimpled polyimide particles are washed with acetone from the silicone oil using a sonicator. The dimpled polyimide particles are separated by centrifugation, and then dried in an oven at 60° C. The polyamic acid is partially converted, about 75 percent, to the dimpled polyimide particles by imidization in the heated silicone oil. The dimpled polyimide particles are then deposited on a heated stainless steel substrate, and then heated to about 310° C. to complete the about 100 percent curing of the dimpled polyimide particles.

The above generated dimpled polyimide particles are then mixed with special carbon black 4 obtained from Evonik Incorporated and coated on a stainless steel substrate. The formed intermediate transfer member film, 87/13 by weight of dimpled polyimide particles and 13 weight percent of carbon black particles, is after cooling to room temperature removed from the stainless steel substrate Example II The above prepared dimpled polyimide particles of Example I, special carbon black 4 obtained from Evonik Incorporated, and the polyamic acid of pyromellitic dianhydride/4,4-oxydianiline, PYRE-ML™ RC5019 obtained from Industrial Summit technology Corp., Parlin, N.J. are ball milled in the solvent NMP with the solid content being about 16 weight percent, and the polyimide particles/carbon black/polyamic acid of pyromellitic dianhydride/4,4-oxydianiline weight ratio of 30/13/57. The obtainable dimpled polyimide particles/carbon black/polyamic acid dispersion is flow coated on a stainless steel substrate at about 23° C., and subsequently cured at 190° C. for 30 minutes, and 320° C. for 60 minutes. There resulted a 75 micron thick layer mixture of the dimpled polyimide particles, carbon black, polyamic acid (30/13/57 weight percent of solids). The formed intermediate transfer member film is then removed or self releases from the stainless steel substrate.

Example III

The polyamic acid/carbon black dispersion as prepared in Comparative Example 1 is electrosprayed onto a stainless steel substrate, which has a temperature of about 200° C. to form the intermediate transfer member instead of draw bar coating on the substrate at a temperature of about 23° C. as in Comparative Example 1. The polyamic acid/carbon black dispersion is electrosprayed at a flow rate of 0.5 mL/h at the applied voltage of 14 kV. The sprayed droplets are directly deposited on a heating stainless steel substrate at about 200° C. Finally, the resulting coating film is cured at 300° C. for 1 hour, and removed from the substrate.

Compared with the Comparative Example 1 member, the Example I, II and III members are expected to possess a water contact angle of from about 105 to about 160 degrees, and more specifically, about 115 degrees for the Example I member, about 151 degrees for the Example II member, and about 105 degrees for the Example III member which is significantly higher than that of the Comparative Example 1 member, which has a water contact angle of about 70 degrees.

In addition, the Example I, II and III members are expected to possess comparable mechanical strength and resistivity to the Comparative Example member.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member comprising polyimide particles that possess dimpled surfaces and wherein said dimpled polyimide particles are present in an amount of from about 70 to about 95 weight percent, and further including a conductive filler present in an amount of from about 5 to about 30 weight percent of the total solids.

2. The intermediate transfer member in accordance with claim 1 wherein said dimples of said dimpled surface encompass from about 95 to about 98 percent of the surface area of the polyimide particles.

3. The intermediate transfer member in accordance with claim 1 wherein said dimples of said dimpled surface encompass from about 90 to about 95 percent of the surface area of the polyimide particles.

4. The intermediate transfer member in accordance with claim 1 wherein said particles are superhydrophobic, possess a water contact angle of from about 101 to about 200 degrees, and wherein said dimpled polyimide particles are of a diameter of from about 0.1 to about 5 microns as determined by scanning electron microscopy.

5. The intermediate transfer member in accordance with claim 4 wherein said water contact angle is from about 105 to about 175 degrees, and wherein said dimpled polyimide particles are of a spherical shape and of a diameter of from about 0.1 to about 4 microns as determined by scanning electron microscopy.

6. The intermediate transfer member in accordance with claim 4 wherein said water contact angle is from about 150 to about 200 degrees.

7. The intermediate transfer member in accordance with claim 1 wherein said conductive filler is carbon black, a metal oxide, a polyaniline, or mixtures thereof.

8. The intermediate transfer member in accordance with claim 1 where the weight ratio of said polyimide particles to said conductive filler is from about 95/5 to about 60/40.

9. The intermediate transfer member in accordance with claim 8 where the weight ratio of said polyimide particles to said conductive filler is from about 90/10 to about 80/20.

10. The intermediate transfer member in accordance with claim 1 wherein said conductive filler is carbon black present in an amount of from about 5 to about 30 weight percent based on the total of said ingredients in said member being about 100 percent.

11. The intermediate transfer member in accordance with claim 1 wherein said dimpled polyimide particles are prepared by an electrospraying process.

12. The intermediate transfer member in accordance with claim 1 further including a supporting substrate.

13. The intermediate transfer member in accordance with claim 12 wherein said supporting substrate is comprised of thermosetting polyimides that possess a weight average molecular weight of from about 100,000 to about 1,000,000, and a number average molecular weight of from about 10,000 to about 100,000 as determined by Gel Permeation Chromatography, and wherein said member has a resistivity of from about $10^8$ to about $10^{13}$ ohm/square.

14. The intermediate transfer member in accordance with claim 1 wherein said member further includes a polymer.

15. The intermediate transfer member in accordance with claim 14 wherein said polymer is a polyimide, a polycarbonate, a polyamideimide, a polyphenylene sulfide, a polyamide, a polysulfone, a polyetherimide, a polyester, a polysiloxane, and their blends.

16. A self-cleaning wear resistant intermediate transfer member comprised of a supporting substrate, and a layer thereover comprised of a mixture of superhydrophobic dimpled polyimide particles wherein said polyimide dimpled particles have a water contact angle of from about 105 to about 200 degrees, and wherein said dimpled polyimide particles are present in an amount of from about 70 to about 95 weight percent of the layer, and further including a conductive filler present in an amount of from about 5 to about 30 weight percent of the total solids of the layer.

17. The intermediate transfer member in accordance with claim 16 which member accepts a xerographic developed image from a photoconductor and subsequently said developed image is simultaneously transferred to a substrate and fixed by heat and pressure.

* * * * *